United States Patent [19]

Wang et al.

[11] Patent Number: 4,992,996

[45] Date of Patent: Feb. 12, 1991

[54] INTERVAL VELOCITY ANALYSIS AND DEPTH MIGRATION USING COMMON REFLECTION POINT GATHERS

[75] Inventors: Shein S. Wang; Doublas W. Hanson; Thomas D. Cavanaugh, all of Ponca City, Okla.

[73] Assignee: Conoco Inc., Ponca City, Okla.

[21] Appl. No.: 472,935

[22] Filed: Jan. 31, 1990

[51] Int. Cl.$^5$ ............................................. G01V 1/36
[52] U.S. Cl. ........................................ 367/53; 367/50
[58] Field of Search .................. 364/421; 367/50, 51, 367/53, 73

[56] References Cited

U.S. PATENT DOCUMENTS

| | | | |
|---|---|---|---|
| H482 | 6/1988 | Berryhill et al. | 367/38 |
| 4,241,429 | 12/1980 | Bloomquist et al. | 367/52 |
| 4,330,872 | 5/1982 | Bretton | 367/53 |
| 4,736,347 | 4/1988 | Goldberg et al. | 367/46 |
| 4,745,585 | 5/1988 | Larner | 367/50 |
| 4,766,574 | 8/1988 | Whitmore, Jr. et al. | 367/50 |
| 4,802,146 | 1/1989 | Moeckel | 367/52 |
| 4,802,147 | 1/1989 | Moeckel | 367/57 |
| 4,813,027 | 3/1989 | Tieman | 367/52 |
| 4,839,869 | 6/1989 | Corcoren | 367/53 |

OTHER PUBLICATIONS

Etgen, John T.; "Interval Velocity Estimation Using Prestack Depth Migration (B-10)", May 29–Jun. 2, 1989, Geophysics Dept., Stanford University, p. 55.

Etgen, John T., "Velocity Analysis Using Prestack Depth Migration: Linear Theory"; Oct. 30–Nov. 3, 1988; Stanford University; Exp. Abs. with Biog., 1988 Technical Program, vol. 2, S9.7, pp. 909–912.

Etgen, John T., "Velocity Analysis Using Prestack Depth Migration: Applying the Linear Theory"; Rept. No. 60, May 1989, pp. 25–40; Stanford Exp. Proj.; Bd. of Trustees, Leland Stanford Junior Univ.

*Primary Examiner*—Ian J. Lobo

[57] ABSTRACT

A method for performing velocity analysis while eliminating the effects on weak signals caused by strong signals includes migrating each event of the pre-stack trace to a single location instead of all possible locations. This correct location is determined by ray-tracing through a velocity model. The input trace is divided into many windows, and each window is migrated to a place determined by ray-tracing the center of the window through the model. If the velocity model is accurate, each event will be migrated to the proper location yielding an accurate depth section with no migration artifacts. As a by-product, if the model is not accurate, the post-migrated parts (PMP's) provide a clean velocity analysis.

5 Claims, 6 Drawing Sheets

INTERVAL VELOCITY ANALYSIS AND DEPTH MIGRATION USING COMMON REFLECTION POINT GATHERS

BACKGROUND OF THE INVENTION

1. Field of the Invention

The present invention pertains to interval velocity analysis and more particularly to interval velocity analysis and depth migration which uses common reflection point (or common depth point) gathers.

2. Related Prior Art

Figure 1:
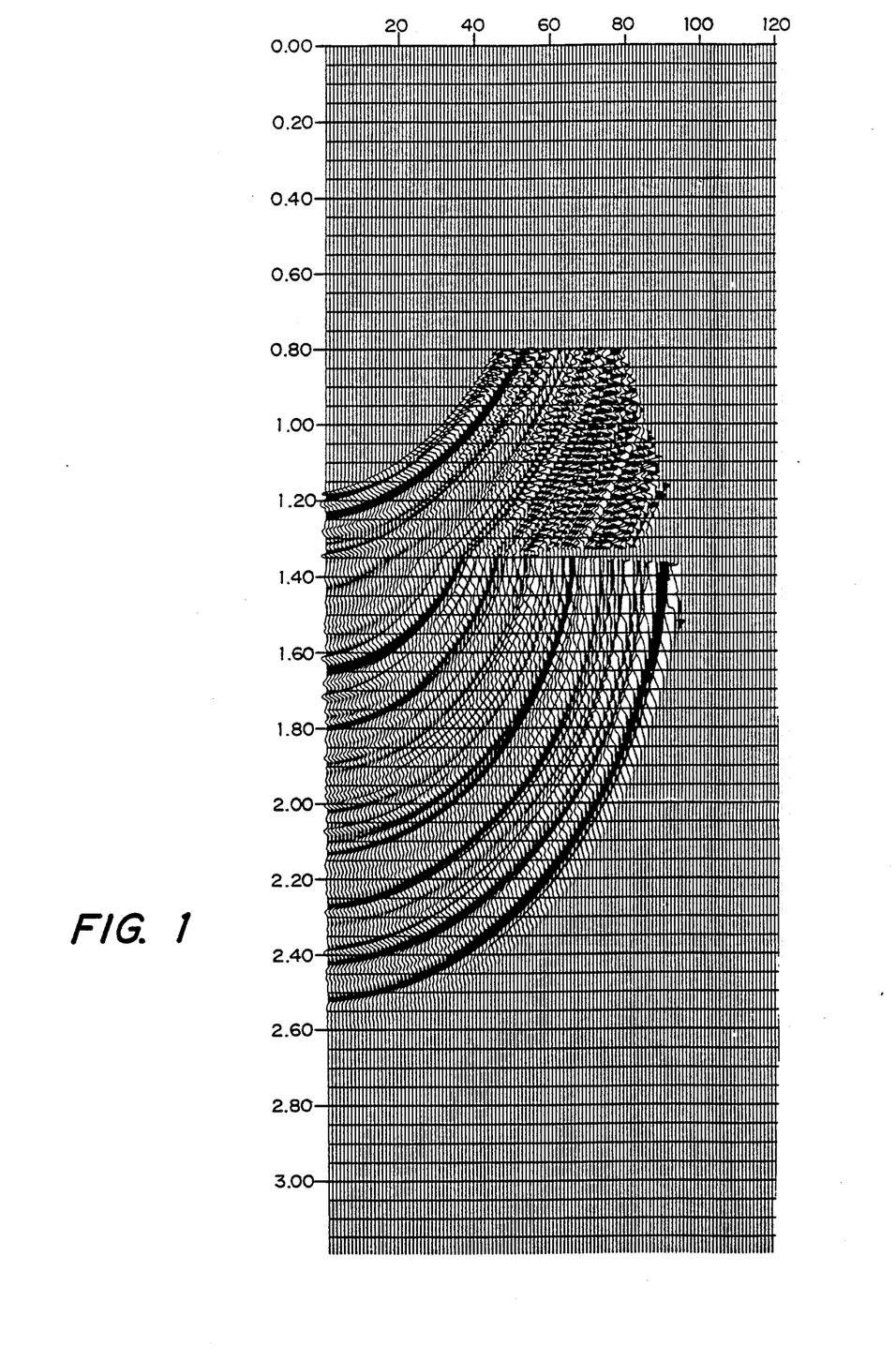
FIG. 1 shows the result of migrating single seismic trace.

Migration techniques operate by broadcasting all recording events on a pre-stack input trace to all possible subsurface locations from which the reflection event could have originated. FIG. 1 shows the result of migrating single trace.

Figure 2:
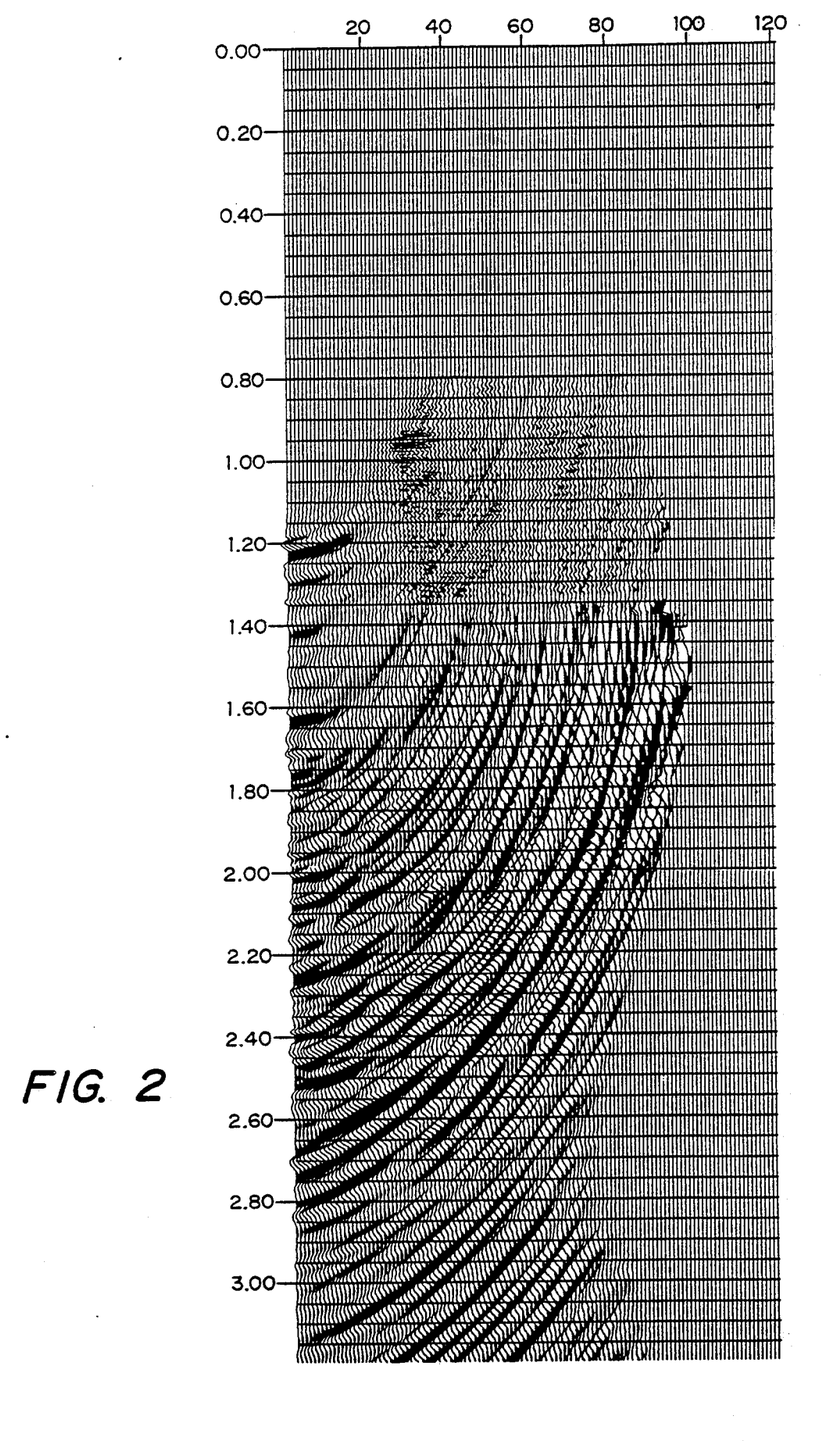
FIG. 2 shows the result of migrating twelve shots, each consists of eighty traces.

When more traces are broadcasted, images begin to appear at places where broadcasted events are reinforcing each other. At places where no images are expected, the corresponding broadcasted events should cancel each other. FIG. 2 shows the result of migrating twelve shots, each consists of eighty traces. The images are forming on the left edge of the figure, and cancellation is apparent shallow in the section.

Figure 3:
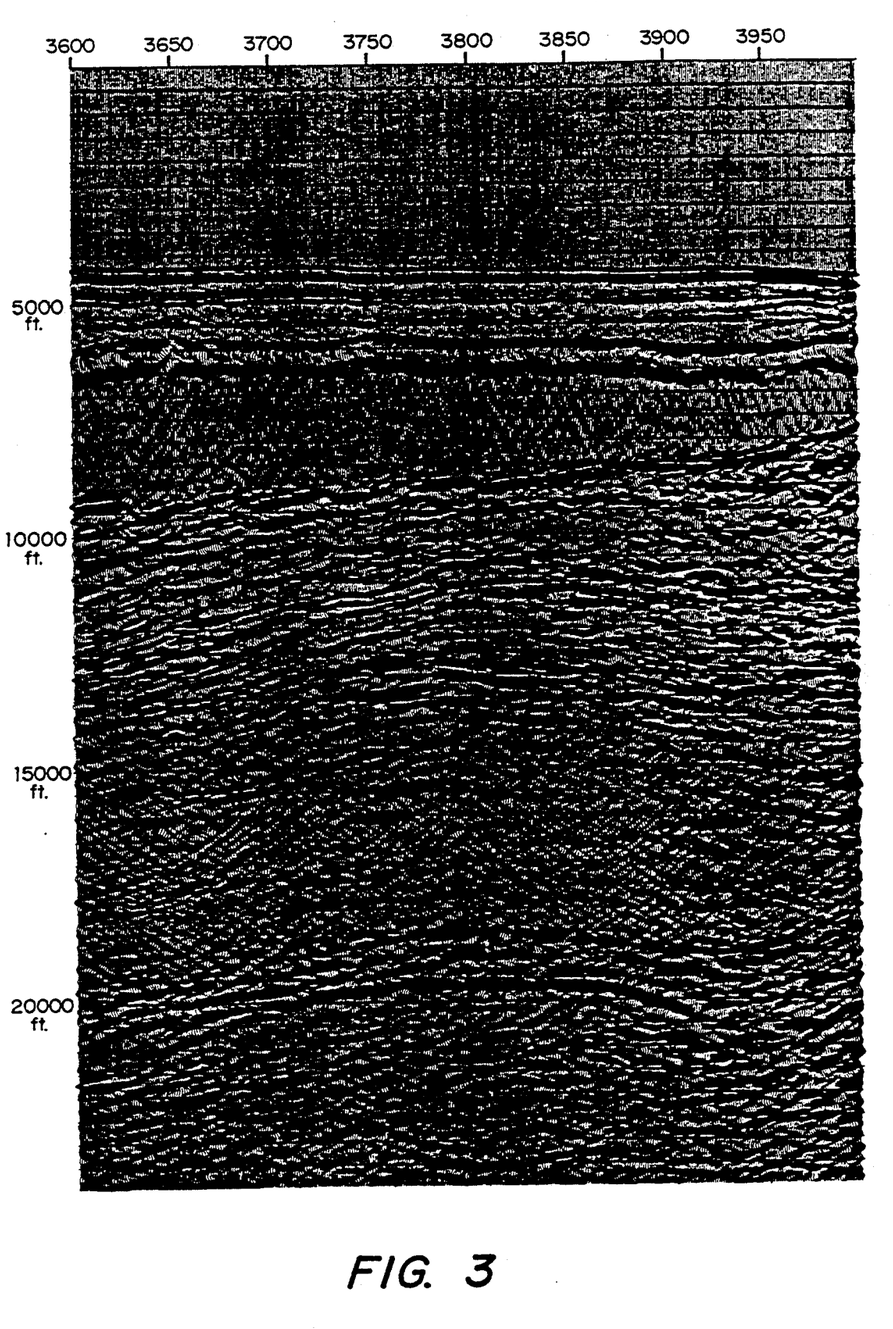
FIG. 3 shows the result of migrating a complete line of thirty-three thousand traces.

FIG. 3 shows the result of migrating a complete line of 33,000 traces. Over most of the migrated section we have clean images, which means the broadcasting methods works well. But between 16000 to 19000 feet there are artifacts, or migration arcs, which indicates incomplete cancellation of unwanted events. This occurs primarily in regions where the desired image is weak. A strong event recorded on either side or below a weak event can arc into this region and interfere with the weak image.

Prior art has disclosed many methods for processing seismic data which are used with common reflection point (CRP) gathers. Normal moveout correction is primarily used to compensate for noise or undesirable effects. As indicated previously, a significant problem with processing and migrating seismic data in the application of CRP analysis occurs when strong events occur near weak events. Examples of processing methods which include migration and normal moveout correction are as follows.

United States Registration number H482 "Seismic Migration Method" (John R. Berryhill et al.) relates to a seismic data processing method in which seismic traces are subjected to Fourier transformations. The coefficients of the Fourier-Transformed traces are subjected to a recursive FK migration operation. The migrated traces are thereafter inverse-Fourier-transformed. Each trace contains a signal resulting from reflection of a seismic signal at a location within the earth, and each trace is associated with at least one point in a two-dimensional spatial grid (x,y). When displayed, the processed seismic data represents the position within the earth of whatever caused the reflection. The method may be employed to process stacked seismic traces, each associated with a single point (x,y) in the grid, or may be employed to process unstacked seismic traces, each associated with both a seismic source location $(X_s,Y_s)$ and a different seismic receiver location $(X_r,Y_r)$ in the grid. In performing the method, the earth is modeled as a stack of M horizontal layers, each characterized by a seismic wave velocity. The recursive FK migration step is iterated $M-1$ times for each trace, where part of the output of each iteration is stored and part discarded.

U.S. Pat. No. 4,802,147 titled "Method for Segregating and Stacking Vertical Seismic Profile Data in Common Reflection Point Bins" (George P. Moeckel) relates to a method for segregating and stacking vertical seismic profile data. The offset difference between the well location and the position of the source is divided into equal segments. Vertical seismic profile moveout corrected data is placed in common reflection point bins and stacked.

U.S. Pat. No. 4,813,027 titled "Method and Apparatus for Enhancing Seismic Data" (Hans Tieman) relates to a method and apparatus for stacking a plurality of seismic midpoint gathers to provide a pictorial representation of seismic events. The approximate propagation velocity, corresponding to a selected event in a common midpoint gather, is determined by summing the common midpoint gather using first and second weights to provide respective first and second weighted sums over an offset based on an estimated velocity corresponding to the event. A velocity error value indicative of the approximate error between the estimated velocity and the actual velocity is developed from the sums. The common midpoint gather is then restacked in accordance with the determined propagation velocity to provide an enhanced pictorial representation of the seismic event. The first and second weighted sums are taken over a time window centered upon an estimated zero offset travel time for the event. The first and second weights can be selected to provide rapid, slow or intermediate convergence upon the true velocity. The velocity error value is determined as a function of the deviation of the peak of the first weighted sum from the center of the time window, relative to the deviation of the peak of the second weighted sum from the center of the time window. Alternatively, the velocity error value is determined as a function of the deviation of the peak of the cross-correlation of the first and second weighted sums from the center of the time window.

U.S. Pat. No. 4,241,429 titled "Velocity Determination and Stacking Process from Seismic Exploration of Three Dimensional Reflection Geometry" (Marvin G. Bloomcuist et al.) relates to a method for determining the dip and strike of subsurface interfaces and average propagation velocity of seismic waves. In seismic exploration, linear, multiple fold, common depth point sets of seismograms with three dimensional reflection geometry are used to determine the dip and strike of the subsurface reflecting interfaces and the average velocity of the path of the seismic energy to the reflecting interface. The reflections in each set appear with time differences on a hyperbola with trace spacings determined by the source receiver coordinate distance along the lines of exploration. The offset of the apex of this hyperbola is determined from a normal moveout velocity search of the type performed on two dimensional common depth point (CDP) sets. This search identifies the correct stacking velocity and hyperbola offset which are used to determine dip, strike and average velocity.

U.S. Pat. No. 4,766,574 titled "Method for Depth Imaging Multicomponent Seismic Data" (Norman D. Whitmore, Jr., et al ) relates generally to a method of geophysical exploration. This method may be used for imaging multicomponent seismic data to obtain depth images of the earth's subsurface geological structure as well as estimates of compressional and shear wave interval velocities. In particular, measures are obtained of imparted seismic wavefields incident on reflecting interfaces the earth's subsurface and of resulting seismic wavefields scattered therefrom. The incident and scattered seismic wavefields are employed to produce time-dependent reflectivity functions which are representative of the reflecting interfaces. By migrating the time-dependent reflectivity functions, better depth images of the reflecting interfaces can be obtained. For a dyadic set of multicomponent seismic data, the dyadic set is partitioned in order to separate the variously coupled incident and reflected wavefields in the recorded multicomponent seismic data. The incident and reflected wavefields are cross-correlated to form reflectivity functions that are time-dependent. These time-dependent reflectivity functions are then iteratively migrated according to a model of wavefield velocities of propagation to obtain estimates of the compressional and shear wave interval velocity. The migrated reflectivity functions can then be stacked to produce depth images of the earth's subsurface geological structures.

U.S. Pat. No. 4,802,146 titled "Method for Moveout Correction and Stacking Velocity Estimation of Offset VSP Data" (George P. Moeckel) relates to a moveout correction process and stacking velocity estimation process to permit stacking of vertical seismic profile (VSP) data. The primary reflection time is determined by using the two-way travel time, the root mean square velocity of acoustic pulses in the formation and the first arrival time of direct path acoustic pulses.

U.S. Pat. No. 4,736,347 titled "Multiple Stacking and Spatial Mapping of Seismic Data" (Bernard Goldberg et al.) relates to a method for determining the dip of subsurface formations and the apparent acoustic velocity. Seismic traces are stacked in a plurality of orthogonal measures to form multiple stacked traces at a positive offset. The stacking process determines the apparent velocities as functions of the travel time at the positive offset. The interval acoustic velocity of the first layer is then determined from knowledge of surface topography, source-receiver offset, two-way travel times and the first reflector apparent velocities. The first layer velocity information enables the incident and emergent angles of the raypaths at the surface to be calculated, as well as enabling the dip angles and spatial coordinates of the reflection points on the first reflecting boundary to be determined. Seismic data corresponding to the second reflecting boundary are then mapped spatially to the first reflecting boundary by ray tracing and by calculating the apparent velocities at the first boundary. The process is repeated for each succeedingly deeper boundary. The derived acoustic velocity model of the earth is displayed as a stacked seismic section in spatial coordinates. This process may be applied to obtain earth models and seismic sections in both two and three dimensions.

U.S. Pat. No. 4,745,585 titled "Method of Migrating Seismic Data" (Kenneth L. Larner) relates to a method for migrating seismic data in steps where each step is a portion of the total migration. Seismic data is passed through a preselected number of migration stages. During each stage, data is migrated a plurality of times, where the migration-velocity function is a minor fraction of the velocity required to fully migrate the data in a single stage. The cascaded migration is used to migrate data having steeply-dipping events.

Although prior art has shown ways to correct for specific migration problems, the problem of strong events cancelling or overriding weak events still remains.

SUMMARY OF THE INVENTION

The present invention eliminates this problem by migrating each event of the pre-stack trace to a single location instead of all possible locations. This correct location is determined by ray-tracing through a velocity model. Specifically, the input trace is divided into many windows, and each window is migrated to a place determined by ray-tracing the center of the window through the model. If the velocity model is accurate, each event will be migrated to the proper location yielding an accurate depth section with no migration artifacts. As a by-product, if the model is not accurate, the post-migrated parts (PMP's) migrated common offset depth sections sorted into common midpoint gathers provide an interpretable velocity analysis. In this manner, the present invention provides a reliable and efficient velocity analysis and clean migration at structurally complex areas.

DESCRIPTION OF THE PREFERRED EMBODIMENT

The present invention eliminates the problem caused by strong signals effecting and even, at times, completely overriding weak signals by migrating each event of the pre-stack trace to a single location instead of all possible locations. This correct location is determined by ray-tracing through a velocity model. Specifically, the input trace is divided into many windows, each window is migrated to a place determined by ray-tracing the center of the window through the model. If the velocity model is accurate, each event will be migrated to the proper location yielding an accurate depth section with no migration artifacts. As a by-product, if the model is not accurate, the post-migrated parts (PMP's) provide an interpretable velocity analysis.

In contrast, prior art common offset migration techniques allow determination of velocity by comparing migrated depth images, which as discussed above, are affected by migration artifacts.

Figure 4:
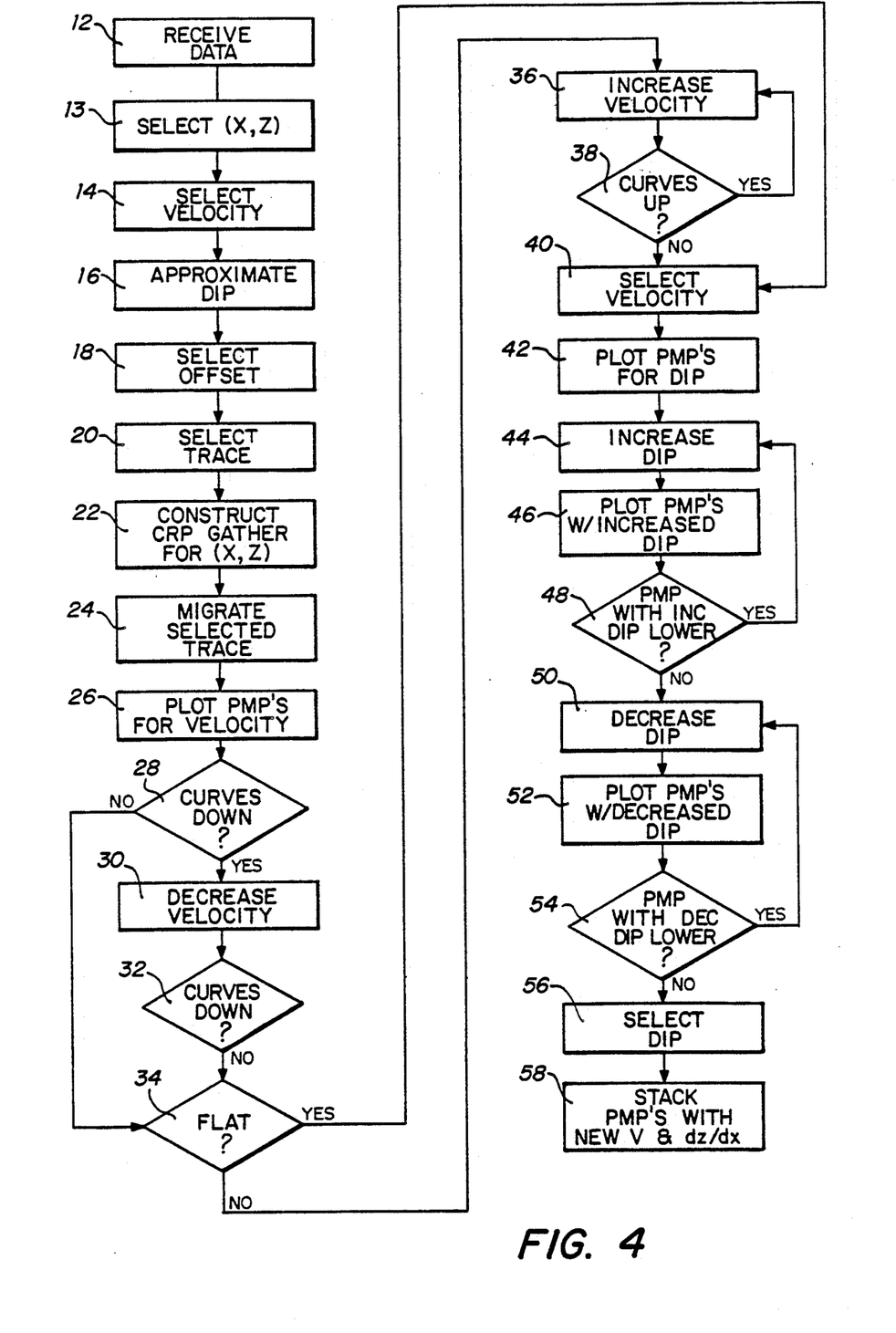
FIG. 4 is a flow chart illustrating the method of the present invention.
Figure 5:
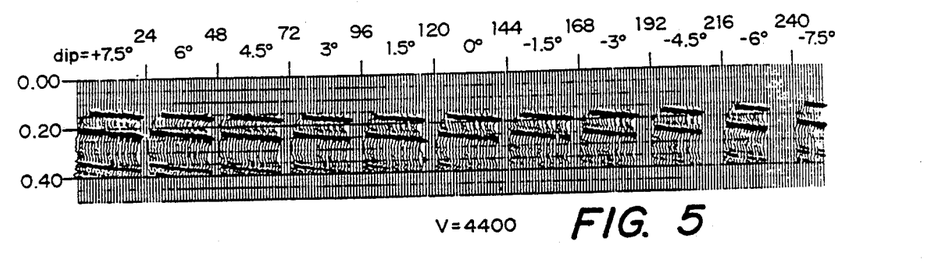
FIGS. 5–9 are velocity analysis of a first layer using fifty-five post migrated part's arranged in five rows, each row using a different velocity.
Figure 6:
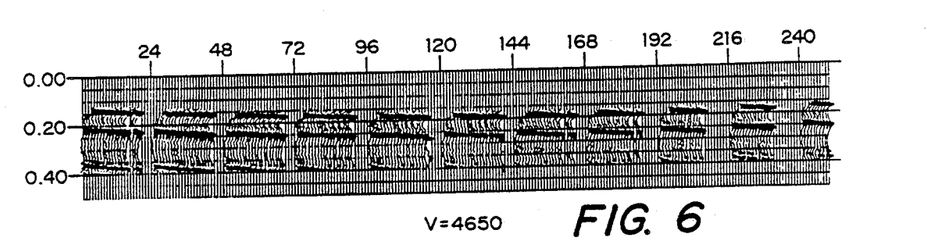
Figure 7:
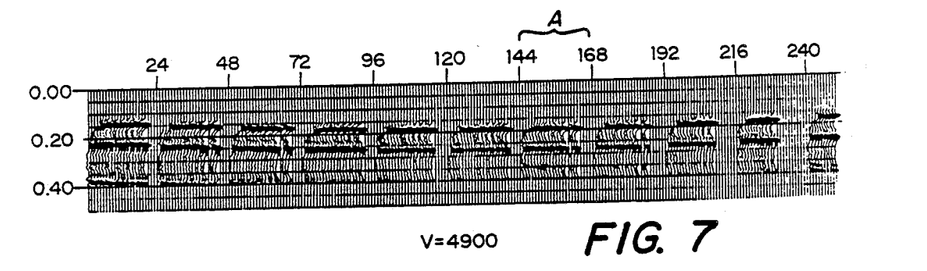
Figure 8:
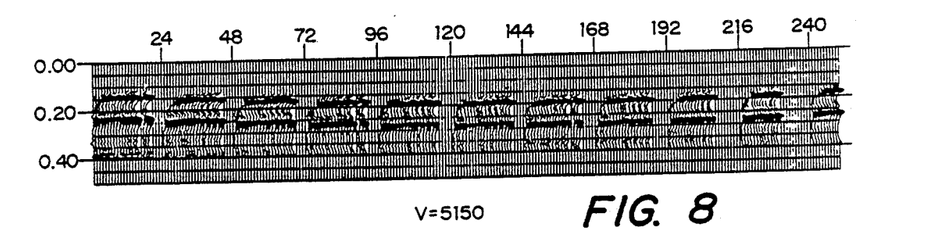
Figure 9:
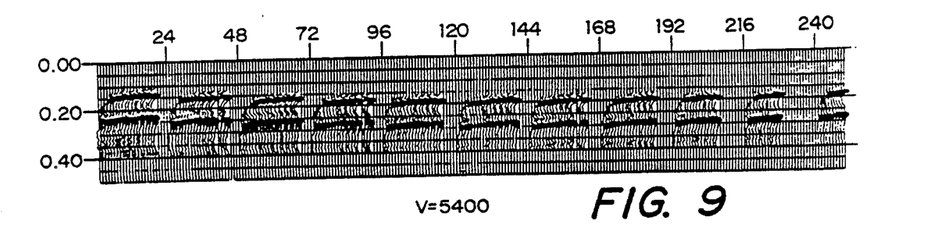

Referring now to FIG. 4, a flow chart of the method of the present invention is illustrated in block form. In block 12 data is received. This data is preferably in the form of a velocity model however, any format which can be placed in the form of a velocity model may be used.

At block 13 a location (x,z) is selected for velocity analysis. At block 14 a velocity is selected for testing. Next, the dip of the selected trace is approximated at block 16. At block 18 an offset is selected. At block 20 a trace is selected. At this point, the input trace is divided into many windows, and each window is migrated to a place determined by ray-tracing the center of the window through the model. A trace is selected if it is migrated to (x,z). For a given offset, at most, one trace can be selected. Depending on the shot and receiver intervals, some offsets may not reflect from (x,z) at all and will not be represented in the CRP gather.

At block 22, a common reflection point (CRP) gather for the reflection point (x,z) is obtained.

For any depth point (x,z), if the velocities above it are known, and the dip of the reflector at (x,z) is given, a Common Reflection Point (CPR) gather consisting of all the source receiver pairs that reflects at (x,z) can be constructed. These are the only traces that could record the echo from (x,z). Hence, they are the only ones that should be migrated to (x,z).

Note that the traces of the CRP gather will be selected knowing the basement location x, the depth z, the velocities $v_i$ (for i=1, n−1) above this reflector, and dip dz/dx of this (n-th) reflector at (x,z).

Each trace is migrated at block 24. Migrating each trace of the CRP gather to (x,z), a post migrated part is formed.

The next part of the program deals with the determination of velocity. At block 26 the PMP's for the selected velocity are plotted. At block 28 the plot is analyzed to determine whether the plot dips down at the far offset end. If the plot dips down, the program proceeds to block 30 where the velocity is decreased, followed by block 32 where the plot with the decreased velocity is analyzed to determine whether this plot dips down at the far offset. If the plot dips down, the program returns to block 30 where the velocity is decreased and the process is repeated. If the plot of post migrated parts do not dip down at either block 28 or block 32, the program proceeds to block 34, where a determination of whether the plot is flat is made. If the plot is not flat, the program proceeds to block 36 where the velocity is increased and the resulting plot is analyzed at block 38. If the plot dips up at the far offset, the process returns to block 36 where the velocity is again increased and the plot is analyzed at the far offset for flatness.

The post migrated parts (PMP's) are plotted for a specific dip at block 42.

Traces are plotted at a plurality of possible dip angles. At block 44, the dip is increased and at block 46, the post migrated parts with the increased dip are plotted. At block 48 the two plots are compared to determine which image is deeper or has the greater z value. If the post migrated part with the increased dip is lower, the program returns to block 44 where the dip is increased. If the post migrated part with the increased dip is higher, the program proceeds to block 50 where the dip is decreased. At block 52 the post migrated part with decreased dip is plotted. The plot of the post migrated part with decreased dip is compared with the plot of the post migrated part brought down from block 48 at block 54. If the post migrated part with decreased dip is deeper, or has a higher z value, the program returns to block 50 where the dip is decreased. If the post migrated part with decreased dip is shallower, the program proceeds to block 56 where the dip is selected.

FIGS. 5–9 are the velocity analysis of the first layer using fifty-five post migrated part's arranged in five rows or figures, each row using a different velocity, ranging from 4400 ft/sec at the top to 5400 ft/sec at the bottom. Within each row there are 11 post migrated part's each using a different dip, ranging rom 7.5 degrees at the left to −7.5 degrees to the right. For any velocity, the correct dip is the one where the image is the deepest. This is due to Snell's Law.

Within each post migrated part the near offset is to the right. When the velocity above (x,z) is too slow, the image dips up toward the left (top row, where v=4400 ft/sec was used). When the velocity is too fast, the image dips down toward the left (bottom row, where v=5400 ft/sec was used). The middle shows a flat image which indicates that v=4900 ft/sec is accurate. The best dip to use is bracketed and identified with a label A, which indicates that the dip of the reflector at (x,z) is −1.5 degrees. This image is formed at a depth of 5950 feet, which means that the depth of the reflector at basement x is 5950 feet.

If the plot is flat when analyzed at block 50 or it no longer dips up at block 54, the program proceeds to block 56 where the correct dip is selected. At block 58 the post migrated part's are stacked with the new velocity and dip (dx/dt).

In summary, this method provides a means to determine the best velocity to use above the reflector, the depth of the reflector, and an estimate of the local dip at the reflector. Working from the first layer down the whole velocity model can be determined.

Figure 10:
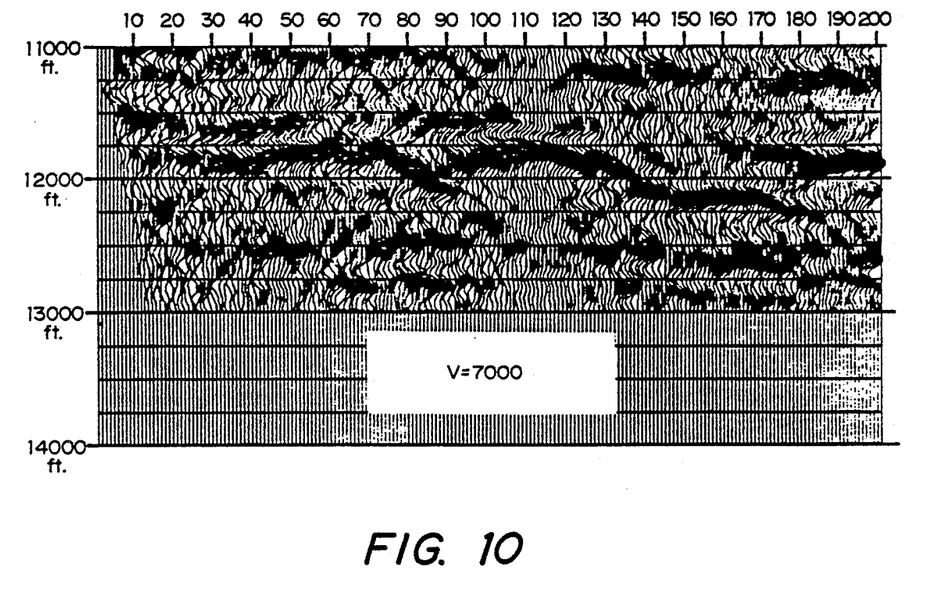
FIG. 10 is the result of stacking one hundred eighty consecutive post migrated part's with properly chosen velocity and dip values.

Once the proper post migrated part is chosen, stacking of the post migrated part gives us a clear, arc free, local migration. FIG. 10 is the result of stacking 180 consecutive post migrated part's with properly chosen velocity and dip values. Repeating this procedure at a grid of (x,z) points will give us a complete depth section.

The present invention has been described by way of a preferred embodiment, however, it is to be understood as not limited thereto, but only by the scope of the following claims.

We claim:

1. A method for determining velocity with actual dip comprising the steps of:
   receiving seismic data including a velocity model;
   selecting an offset;
   selecting a single trace;
   calculating an initial velocity;
   approximating an initial dip of said selected portion of said single trace;
   constructing a common reflection point gather;
   migrating each trace of said common reflection point gather to form a post migrated part;
   plotting said post migrated part for said initial velocity;
   varying said initial velocity to determine a true velocity for said selected offset;
   plotting said post migrated part for said initial dip;
   increasing the initial dip;
   comparing said post migrated part having the initial dip and the increased dip;
   determining an actual dip by increasing the dip again whenever said post migrated part with the increased dip is deeper and decreasing the dip whenever said post migrated part with the increased dip is shallower; and
   stacking said post migrated part using said true velocity with the actual dip.

2. The method according to claim 1 wherein said varying the initial velocity step includes the steps of:

plotting said single trace a plurality of times, each plot having a different velocity; and determining said true velocity by selecting the velocity of the plot which is flat.

3. An apparatus for determining interval velocities with an actual dip comprising:

means for receiving seismic data which includes a velocity model;

first selecting means for selecting an offset;

second selecting means for selecting a single trace;

means for calculating an initial velocity;

means for approximating an initial dip of said selected portion of said single trace;

means for constructing a common reflection point gather;

means for migrating each trace of said common reflection point gather to form a post migrated part;

first means for plotting said post migrated part for said initial velocity;

means for varying said initial velocity to determine a true velocity for said selected offset;

second means for plotting said post migrated part for said initial dip;

dip varying means for varying said initial dip to approximate an actual formation dip; and     stacking means for stacking said post migrated part using said actual formation dip and said true velocity.

4. A method for determining velocity with an actual dip comprising the steps of;

receiving seismic data including a velocity model;

selecting an offset;

selecting a single trace;

calculating an initial velocity;

approximating an initial dip of said selected portion of said single trace;

constructing a common reflection point gather;

migrating each trace of said common reflection point gather to form a post migrated part;

plotting said post migrated part for said initial velocity;

plotting said single trace a plurality of times, each plot having a different velocity;

determining a true velocity by selecting the velocity of the plot which is flat,     plotting said post migrated part for said initial dip;

increasing the initial dip;

plotting said post migrated part having the initial dip and the increased dip;

increasing the dip again whenever said post migrated part with the increased dip is deeper;

decreasing the dip whenever said post migrated part with the increased dip is shallower; and     selecting the dip corresponding to the dip of the post migrated part that is deepest as the actual formation dip; and     stacking said post migrated part using said actual formation dip and said true velocity.

5. A method for determining the depth of a formation comprising the steps of:

receiving seismic data including a velocity model;

selecting an offset;

selecting a single trace;

approximating an initial dip of said selected portion of said single trace;

constructing a common reflection point gather;

migrating each trace of said common reflection point gather to form a post migrated part;

plotting said post migrated part for said initial dip;

increasing the initial dip;

plotting said post migrated part having the initial dip and the increased dip;

increasing the dip again whenever said post migrated part with the increased dip is deeper;

decreasing the dip whenever said post migrated part with the increased dip is shallower; and     selecting the depth of the formation as the depth corresponding to the depth of the post migrated part that is deepest.

* * * * *